(12) United States Patent
Ghai et al.

(10) Patent No.: US 9,301,205 B2
(45) Date of Patent: Mar. 29, 2016

(54) APPLICATION AND CONTENT AWARENESS FOR SELF OPTIMIZING NETWORKS

(71) Applicant: Benu Networks, Inc., Billerica, MA (US)

(72) Inventors: Rajat Ghai, Sandwich, MA (US); David F. Callan, Swampscott, MA (US); Rajendar Duggal, Lincoln, MA (US); Swarup Sahoo, Acton, MA (US); Anil Sangahvi, Westford, MA (US); John Depietro, Sandwich, MA (US)

(73) Assignee: Benu Networks, Inc., Billerica, MA (US)

( * ) Notice: Subject to any disclaimer, the term of this patent is extended or adjusted under 35 U.S.C. 154(b) by 34 days.

(21) Appl. No.: 14/046,583

(22) Filed: Oct. 4, 2013

(65) Prior Publication Data

US 2014/0098762 A1    Apr. 10, 2014

Related U.S. Application Data

(60) Provisional application No. 61/709,749, filed on Oct. 4, 2012.

(51) Int. Cl.
| | |
|---|---|
| *H04W 28/16* | (2009.01) |
| *H04W 76/02* | (2009.01) |
| *H04L 12/26* | (2006.01) |
| *H04L 12/927* | (2013.01) |
| *H04L 12/801* | (2013.01) |

(52) U.S. Cl.
CPC .............. *H04W 28/16* (2013.01); *H04L 43/028* (2013.01); *H04W 76/02* (2013.01); *H04L 47/10* (2013.01); *H04L 47/14* (2013.01); *H04L 47/803* (2013.01)

(58) Field of Classification Search
CPC ........ H04L 47/10; H04L 47/14; H04L 47/803
See application file for complete search history.

(56) References Cited

U.S. PATENT DOCUMENTS

| | | | |
|---|---|---|---|
| 8,264,958 B1 * | 9/2012 | Pankajakshan | 370/230.1 |
| 2003/0016676 A1 * | 1/2003 | Allen et al. | 370/395.52 |
| 2007/0255852 A1 * | 11/2007 | McBride et al. | 709/246 |
| 2008/0130585 A1 * | 6/2008 | Park et al. | 370/332 |
| 2012/0039175 A1 * | 2/2012 | Sridhar et al. | 370/236 |
| 2012/0093086 A1 * | 4/2012 | Yin et al. | 370/328 |
| 2012/0120789 A1 * | 5/2012 | Ramachandran et al. | 370/220 |
| 2012/0246212 A1 * | 9/2012 | Ahmad et al. | 709/201 |
| 2013/0007286 A1 * | 1/2013 | Mehta et al. | 709/227 |
| 2013/0016658 A1 * | 1/2013 | Lovsen et al. | 370/328 |

(Continued)

FOREIGN PATENT DOCUMENTS

| | | | | |
|---|---|---|---|---|
| WO | WO 2012135994 A1 * | 10/2012 | | H04W 36/00 |
| WO | WO 2013016843 A1 * | 2/2013 | | H04W 72/12 |

*Primary Examiner* — David Oveissi
(74) *Attorney, Agent, or Firm* — Wilmer Cutler Pickering Hale and Dorr LLP

(57) ABSTRACT

Systems and methods are described for providing application and content awareness for self-optimizing networks. A computerized method includes receiving at a mobile gateway a session request from a mobile device, establishing a session between the mobile device and the mobile gateway, receiving a request from the mobile device at the mobile gateway to access a remote resource, establishing a connection between the mobile device and the remote resource via the mobile gateway, detecting application and content information of a service data flow of the connection, and sending the application and content information of the service data flow to a network server for network optimization.

23 Claims, 6 Drawing Sheets

(56) References Cited

U.S. PATENT DOCUMENTS

2014/0160936 A1* 6/2014 Liu et al. .................. 370/235
2014/0189838 A1* 7/2014 Zhao et al. .................. 726/7
2014/0235242 A1* 8/2014 Granzow et al. ............ 455/436

* cited by examiner

APPLICATION AND CONTENT AWARENESS FOR SELF OPTIMIZING NETWORKS

RELATED APPLICATIONS

This application claims priority to U.S. Provisional Patent Application No. 61/709,749 filed on Oct. 4, 2012, the content of which is incorporated herein by reference in its entirety.

BACKGROUND

A Public Land Mobile Network (PLMN) is generally a wireless network operated by recognized and authorized organizations called wireless service providers. A PLMN can use radio waves in licensed spectrum to create a telecommunication network for providing mobile telecommunications service to the public. A mobile service can provide continuous connectivity amongst mobile devices or between mobile devices to a fixed network.

PLMNs can use cellular telephony that is generally characterized by the use of radio cells that provide radio coverage for a geographic area, with multiple cells arranged to provide contiguous radio coverage over a larger area. Wired communication can be used in portions of a PLMN, such as between cells, access points, or gateways to create entry/exit points to the Internet. A typical PLMN can include an access network (AN) that is specific to wireless technologies and a core network (CN) that performs routing of mobile communication within the PLMN or from PLMN to extern packet data networks (PDN), e.g., the Internet.

Demand for mobile internet has seen steady growth. It is expected that worldwide demand for IP connectivity and transmission worldwide from mobile devices using wireless networks would be approximate 26,000 peta bytes per day. The current architecture of the PLMN core network, e.g., for Wi-Fi, GPRS, HRPD or WiMAX (CSN) may not be suitable to scale to such high data throughput required for mobile internet without extraordinarily high cost and complexity. In some situations, wireless communication service providers deploy smaller cells in dense areas in order to provide adequate coverage and capacity to the users. However, close proximity of small cells (e.g., Wi-Fi access points) can cause radio interference. Networks with automated management of radio interference for enhancing data throughput are sometimes referred to as self-optimizing networks (SON).

SUMMARY

In accordance with the disclosed subject matter, systems and methods are described for providing application and content awareness for self-optimizing networks.

Disclosed subject matter includes, in one aspect, a computerized method, which includes receiving at a mobile gateway a session request from a mobile device, establishing a session between the mobile device and the mobile gateway, receiving a request from the mobile device at the mobile gateway to access a remote resource, establishing a connection between the mobile device and the remote resource via the mobile gateway, detecting application and content information of a service data flow of the connection, and sending the application and content information of the service data flow to a network server for network optimization.

In some embodiments, the session request is an IP session request and the session is an IP session.

In some embodiments, the request is a user HTTP request.

In some embodiments, the session request is received from the mobile device via an access node.

In some embodiments, the access node is one of an WI-FI access point (AP), a radio base station, a 3G small cell, an eNodeB macro cell, or an eNodeB small cell.

In some embodiments, the computerized method further includes encoding the application and content information in an XML format.

In some embodiments, the application and content information of the service data flow is sent via an interface on the mobile gateway.

In some embodiments, the interface is implemented using Hypertext Transport Protocol (HTTP) messages.

In some embodiments, the interface is implemented using GPRS Tunneling Protocol (GTP-U) header extension.

In some embodiments, the interface is implemented using Differentiated Services Code Point (DSCP) header extension.

In some embodiments, the network server is a SON server.

Disclosed subject matter includes, in another aspect, a mobile gateway, which includes an access node interface configured to receive a session request from a mobile device via an access node and establish a session with the mobile device, an external network interface configured to receive a request from the mobile device to access a remote resource and establish a connection between the mobile device and the remote resource, an application detection module configured to detect application and content information of a service data flow of the connection, and a network optimization server interface configured to send the application and content information of the service data flow to a network optimization server.

In some embodiments, the mobile gateway further includes an end node interface configured to communicate with the mobile device.

In some embodiments, the end node interface is configured to direct the mobile device to disconnect from a currently connected access node.

In some embodiments, the end node interface is further configured to direct the mobile device to connect to a second access node.

In some embodiments, the mobile gateway further includes an application and content information encoder configured to encode the application and contention information.

In some embodiments, the application and contention information is encoded in XML format.

In some embodiments, the network optimization server is a self-optimizing network (SON) server.

In some embodiments, the network optimization server interface is configured to send the application and content information using Hypertext Transport Protocol (HTTP) messages.

In some embodiments, the network optimization server interface is configured to send the application and content information using GPRS Tunneling Protocol (GTP-U) header extension.

In some embodiments, the network optimization server interface is configured to send the application and content information using Differentiated Services Code Point (DSCP) header extension.

Disclosed subject matter includes, in yet another aspect, a non-transitory computer readable medium having executable instructions which are operable to, when executed by a processor, cause the processor to receive at a mobile gateway a session request from a mobile device, establish a session between the mobile device and the mobile gateway, receive a request from the mobile device at the mobile gateway to access a remote resource, establish a connection between the mobile device and the remote resource via the mobile gateway, detect application and content information of a service data flow of the connection, and send the application and content information of the service data flow to a network server for network optimization.

In some embodiments, the network server is a SON server.

Various embodiments of the subject matter disclosed herein can provide one or more of the following capabilities. Content aware self-optimization networks can enhance the optimization of the networks.

These and other capabilities of embodiments of the disclosed subject matter will be more fully understood after a review of the following figures, detailed description, and claims.

DESCRIPTION

Figure 1:
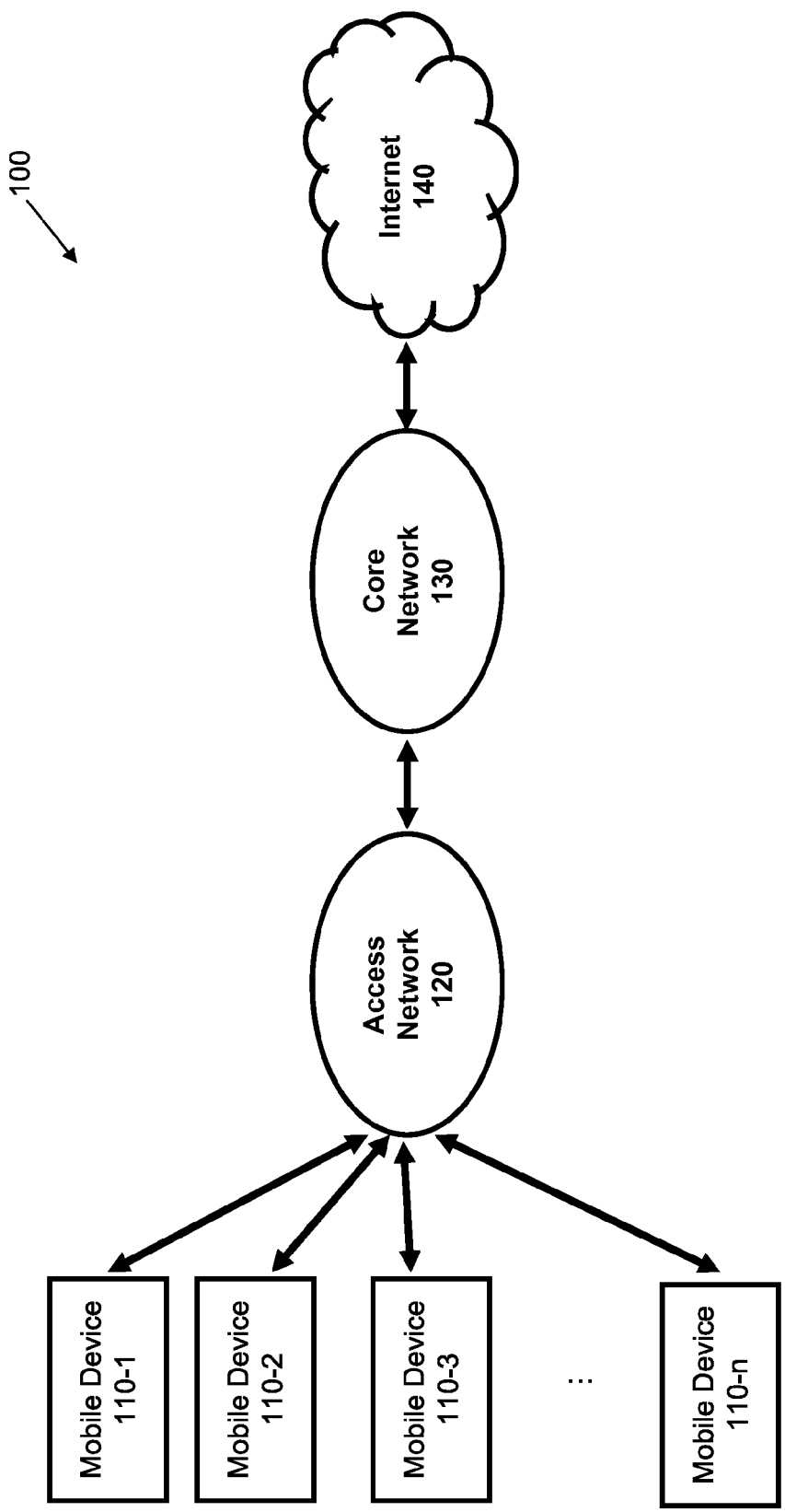
FIG. 1 illustrates an overview of an exemplary network arrangement.

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

PLMNs have evolved over the years following the advancements in cellular technologies. The first generation (1G) cellular technology used analog mobile phones in which analog information signals were modulated and transmitted. The second generation (2G) systems used digital modulation of the information signals to provide more dense and robust wireless systems. Among the many 2G wireless technologies, the most prevalent ones used code division multiple access (CDMA) technologies for IS-95 systems or time division multiplex access (TDMA) technology for GSM systems to distinguish multiple users. 2G wireless networks are primarily used for speech communication. With the advent of the Internet and the demand to access the Internet from portable mobile devices, CDMA based networks were further upgraded to handle higher-speed packet data using CDMA 1×-EVDO in networks referred to as 2.5G while GSM based networks were upgraded to GPRS/EDGE and then HSPA as 3G networks. 3G networks are evolving to 4G technology, which is referred to as long term evolution-system architecture evolution (LTE-SAE) and uses orthogonal frequency division multiple access (OFDMA) technology. Other 4G wireless technologies have also developed including WiMAX (an implementation of IEEE 802.16), Wi-Fi (an implementation of various IEEE 802.11 protocols), and HiperMAN, which is based on an ETSI alternative to IEEE 802.16. 4G networks are based on IP (Internet Protocol) technology to facilitate ultrafast IP packet transmission services.

The range of the wireless communication technology can vary depending on the deployment of the PLMN. A macro cell transceiver is typically used by service providers to provide coverage over about three miles. A pico cell transceiver can provide coverage over about a quarter mile while a femto cell transceiver can provide coverage over 50 to 100 yards that is similar in coverage to a Wi-Fi (WLAN) access point and can be used to provide network access over a short range.

PLMNs use wireless communication technologies to provide speech and data communication services to mobile/portable devices e.g. laptop and notebook computers with many applications (e.g. web browsers to access the Internet), portable digital assistants (PDAs), and bespoke mobile devices (e.g., cellular telephones, user equipment). Users, authorized for the wireless service, can connect to a network (e.g., the Internet) as long as the user is within range of such a wireless communication technology.

For the PLMNs, a part of the evolution of packet based communications has been the development of a core network capable of routing IP based data communication within a PLMN (mobile to mobile) or PLMN to an external network (e.g. mobile to the Internet). IP packet core network functionality can be developed by three different groups for inclusion in two different topologies: Global System for Mobile Communications (GSM), CDMA 2000, and WiMAX. The $3^{rd}$ Generation Partnership Project (3GPP) is responsible for General Packet Radio Service (GPRS) which works with GSM/LTE systems, the 3rd Generation Partnership Project 2 (3GPP2) is responsible for High Rate Packet Data (HRPD) which is used with CDMA systems and WiMAX forum responsible for Access Service Network (ASN) and Connectivity Service Network (CSN).

For 3G UMTS based technologies, such a packet core network is referred to as GPRS (General packet radio service) CN. GPRS is an architectural framework for delivering internet protocol (IP) transmission services to mobile nodes. Main components of a GPRS core network that provide packet services are a SGSN (Serving GPRS Service Node) and a GGSN (Gateway GPRS Service Node). A SGSN manages initial authentication, authorization, mobility, IP session establishment and charging aspects of packet data communications for the mobile nodes. A GGSN manages IP address allocation to the mobile nodes, gathers charging details for the amount of data packets transmitted by the mobile nodes, enforces policies of the PLMN operator, and provides connectivity to external packet data networks (PDNs) such as the Internet.

For LTE based technologies, such a packet core network is referred to as Evolved Packet Core (EPC). EPC is an architectural framework for delivering internet protocol (IP) transmission services to mobile nodes. Main components of an EPC core network that provide packet services are a Mobility Management Entity (MME), a Serving Gateway (SGW), and a PDN Gateway (PGW). The MME manages initial authentication, authorization, mobility, IP session establishment and charging aspects of packet data communications for the mobile nodes. The SGW and PGW manage IP address allocation to the mobile nodes, gather charging details for the amount of data packets transmitted by the mobile nodes, enforce policies of the PLMN operator, and provide connectivity to external packet data networks (PDNs). In a CDMA based HRPD core network, the Packet Data Service Node (PDSN) and Home Agent (HA) provide the architectural framework for delivering internet protocol (IP) transmission services to the mobile node. In a WiMAX core network, Access Service Network Gateway (ASN-GW), Core Service Network Gateway (CSN GW), or HA provides the architectural framework for delivering IP transmission services to the mobile node. In a WiFi core network, the Wi-GW (Wireless Access Gateway) provides the architectural framework for delivering IP transmission services to the mobile node.

Mobile operators have experienced an explosion in mobile broadband data traffic in recent years. Given the rate of growth of mobile broad demand, mobile operators have been answering to this insatiable demand by taking multi-dimensional growth strategies. Those strategies can include: (1) introducing more spectrum (RF carriers) for macro cellular sites; (2) underlay micro cells/small cells in hot zones (very dense urban areas); and (3) augment with carrier Wi-Fi access points. Such deployment of high-speed wireless access technologies like LTE and Wi-Fi in various scales and sizes is collectively referred to as Heterogonous Networks (HetNet). HetNets comprise of traditional large macro cells with a high-density underlay of small cells and Wi-Fi access points. While large macro cells are best suited for fast moving devices and/or sparsely populated rural areas, small cells and Wi-Fi provide higher capacity in dense urban environments by reducing the number of devices per cell as well as placing the device in close proximity of the small cells/Wi-Fi access points to provide near ideal RF conditions for best throughputs. While deployment of HetNets of multiple overlay/underlay radio access networks provides more coverage and capacity, it also creates a challenge for the operators to optimally manage the access network. Unlike traditional macro cellular network, traffic conditions have much higher variability in a HetNet environment. The variability is largely attributed to small footprint and overlap of cells (and Wi-Fi APs) in dense geographical areas (e.g., downtown, sports stadiums, concerts, subway stations etc.). Such traffic variability demands automation of configuration and operational aspects of HetNet by using self-optimizing network (SON) technologies.

The disclosed subject matter can provide a solution where a gateway in the core network provides application and content awareness to other nodes (e.g., Wi-Fi access points or radio base stations) to mitigate radio interference and further enhance SON solutions, in addition to having other desirable characteristics. In some embodiments, a Content Aware SON (cSON) feature pack can enable an intelligent mobile network to quickly and autonomously optimize itself to ensure network quality and user experience. In some embodiments, a cSON feature pack can enhance traditional SON by providing cross correlation of core network intelligence, e.g., per flow application awareness. By merging content awareness with SON algorithms, operators can tune radio frequency (RF) characteristics to specific needs of a subscriber's session. Embodiments of the disclosed subject matter can provide inputs into RF organization. By cooperating with the operators' SON controllers, application awareness can enhance various dynamic SON procedures, such as Inter Cell Interference Coordination (ICIC), Mobility Robustness Optimization (MRO), and optimal load balancing of HetNet.

Systems and methods in the disclosed subject matter can provide advanced mobile internet communication services using application and content awareness for self-optimizing wireless networks of a PLMN core network, e.g., for delivering IP transmission services to mobile devices. An embodiment system can also support standards based communication protocols and enhanced optimizations for implementation of a Wireless Access Gateway (WAG) for providing IP access services to 802.11 family of Wi-Fi networks, a GPRS Service Node (GGSN) function as specified by $3^{rd}$ Generation Partnership Project (3GPP) standards in TS 23.002, SGW and PGW as specified in TS 23.401, or PDG as specified in 23.234. An embodiment system can further support standards based communication protocols for implementation of a PDSN/HA functions as specified by 3GPP2 standards in the CDMA2000 Wireless IP Network Standard (3GPP2 X.S0011-001-E v1.0). An embodiment system can further support standards based communication protocols for implementation of ASN-GW/HA functions as specified by WiMAX standards in WiMAX Forum Network Architecture (WiMAX Forum Document Number WMF-T32-002-R010v04, Feb. 3, 2009). Systems and methods in the disclosed subject matter can provide application and content aware triggers and session information to radio nodes to optimize SON procedures and algorithms in the radio nodes in licensed or unlicensed spectrum.

In some embodiments, system and methods are provided to create an Application Detection and Control Interface (ADCI) that transmits to the radio nodes, the type of content that is being accessed for a given service data flow (SDF). The interface can map the 5 tuple/EPC bearer/Radio bearer with the content type being accessed. In some embodiments, the ADCI is implemented over HTTP transport to the radio nodes. In some embodiments, the ADCI is implemented in GTP-U header of the user session. In some embodiments, the ADCI is implemented in IP/DSCP header of the user session.

The systems and methods described in the disclosed subject matter can be implemented with various network technologies. A Mobile Evolved Gateway (MEG) open programmable mobile internet gateway can perform more than one functions while integrating different functionalities. The MEG open programmable mobile internet gateway can perform as Gateway General packet radio service Support Node (GGSN), GPRS support node (SGSN), mobility management entity (MME), a packet data serving node (PDSN), a foreign agent (FA), or home agent (HA), an HRPD serving gateway (HSGW), a serving gateway (SGW), a packet data network gateway (PGW), an access service network gateway (AS-NGW), packet data inter-working function (PDIF), packet data gateway (PDG), or a Wi-Fi gateway. In certain embodiments, one or more of the abovementioned other types of functionalities are integrated together or provided by the same gateway.

The MEG open programmable mobile internet gateway can also support sessions originated from a femto base station or a Wi-Fi access point over a secure connection, which can connect to the MEG open programmable mobile internet gateway using a broadband network. The gateway can provide trigger based traffic management during a handoff from a small cell base station or wi-fi access point to a macro base station, while maintaining traffic management for the mobile node and preservation of IP address. In certain embodiments the gateway is used as offload device to offload traffic off the macro cellular licensed spectrum to femto or Wi-Fi base stations.

The systems described in the disclosed subject matter can be implemented in hardware and/or software. The software can run on multi blade, multi CPU with multiple processing cores. The operating system software can be based on a Linux software kernel and run specific applications in the gateway and providing protocol stacks.

Embodiments of the disclosed subject matter can be implemented in an networked computing environment. FIG. 1 illustrates an exemplary network arrangement 100 in accordance with certain embodiments of the disclosed subject matter. The network arrangement 100 can include at least one mobile device (e.g., mobile device 110-1, 110-2, 110-3 . . . 110-*n*), an access network 120, a core network 130, and an external network such as the Internet 140. In this document, the reference number 110 can be used to refer to multiple mobile devices collectively or to a particular mobile device.

The mobile device 110 can be any computing device capable of accessing a mobile network. Examples of the mobile device 110 include desktop computers, portable computers, smartphones, tablets, and any other Wi-Fi capable mobile devices. The access network 120 can be configured to allow one or more mobile devices 110 to access the network arrangement 100. The access network 120 can be implemented in various mobile/wireless technologies. Examples of the access network 120 include a Wi-Fi access point, a radio base station, a 3G small cell, an eNodeB macro cell, and an eNodeB small cell, etc. The mobile device 110 can connect to the access network 120 via a network protocol (e.g., IEEE 802.11). The access network 120 can connect to the core network 130 via various interfaces (e.g., an Iu interface, an Generic Routing Encapsulation (GRE) interface, an Si interface, etc.). The core network 130 can then connect to the external network such as the Internet 140. The network arrangement 100 can functionally separate the access network 120 from the core network 130 and allow them to be implemented in various technologies independently.

Figure 2:
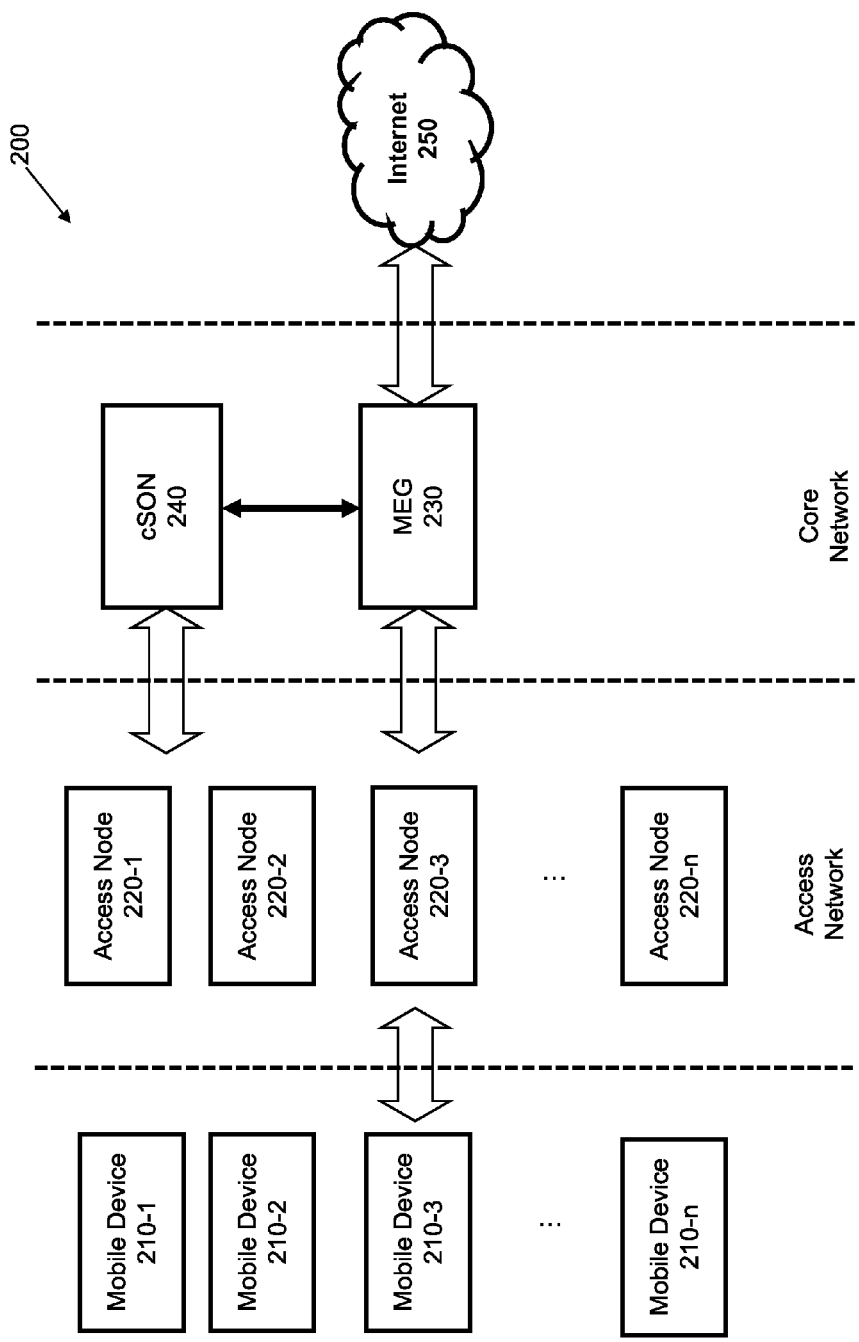
FIG. 2 illustrates another exemplary network arrangement.

FIG. 2 illustrates another exemplary network arrangement 200 in accordance with certain embodiments of the disclosed subject matter. The network arrangement 200 can include one or more mobile devices (e.g., 210-1, 210-2, 210-3 . . . 210-*n*), one or more access nodes (e.g., 220-1, 220-2, 220-3 . . . 220-*n*), a mobile evolved gateway (MEG) 230, a content-aware SON server (cSON) 240, and an external network such as the Internet 250.

In this document, the reference number 210 can be used to refer to multiple mobile devices collectively or to a particular mobile device; the reference number 220 can be used to refer to multiple access nodes collectively or to a particular access node. The access nodes 220 can be part of an access network (e.g., the access network 120 in FIG. 1). The MEG 230 and the cSON 240 can be part of a core network (e.g., the core network 130 in FIG. 1).

The mobile device 210 can connect to the access node 220 in the access network. The access node 220 can then connect to the MEG 230, which can then connect to the Internet 250. The MEG 230 can establish a connection between the mobile device 210 and the Internet 250. One or more service data flows (SDF) can be set up in the connection. The MEG 230 can detect the application and content information (e.g., content type) of the one or more SDFs. In one example, when the mobile device 210 is browsing a webpage, the SDF can carry HTML pages or other contents for the webpages, which in general are relatively small in size and not time-critical. In another example, when the mobile device 210 is accessing a streaming media website, the SDF can carry audio and/or video streaming data, which usually is large in size and time-sensitive. In yet another example, when the mobile device 210 is engaging a live communication (e.g., audio conference or video chat), the SDF can carry live audio/video data, which usually is large in size and time-critical. The different types of data can be treated differently based on their characteristics. The application and content information can allow a content aware SON to enhance network optimization.

Still referring to FIG. 2, once the MEG 230 has detected the application and content information of a SDF. The MEG 230 can forward the application and content information of the SDF to the cSON 240. In some embodiments, the MEG 230 can have an interface (e.g., an Application Detection and Control Interface) to communicate with the cSON 240. More details and examples of the interface are described later in this document. When the cSON 240 receives the application and content information from the MEG 230, the cSON 240 can utilize the information in conjunction with other information to optimize the network. In some embodiments, the cSON 240 can communicate with one or more access node 220 for optimizing the network.

Figure 3:
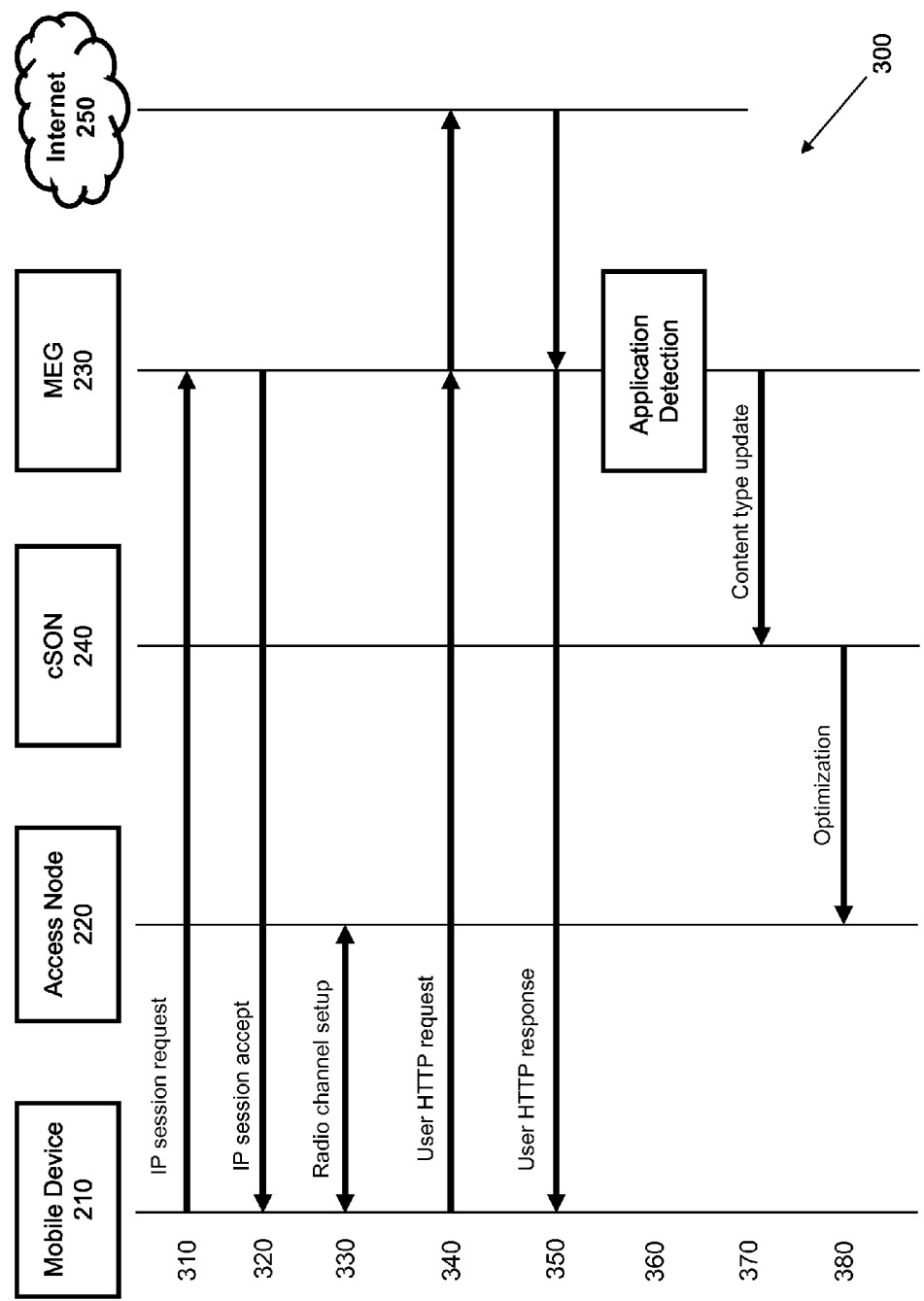
FIG. 3 illustrates an exemplary scenario of network optimization.

FIG. 3 illustrates an exemplary scenario 300 of network optimization according to some embodiments of the disclosed subject matter. The scenario 300 can be modified by, for example, having stages rearranged, changed, added and/or removed. At stage 310, the mobile device 210 can initiate a session request (e.g., an IP session request) to the MEG 230. At stage 320, the MEG 230 can accept the session request from the mobile device 210 and send a response back to the mobile device 210. At stage 330, a radio channel can be set up between the mobile device 210 and the access node 220. At stage 340, the mobile device can send a user request (e.g., an HTTP user request) to the MEG 230, which can forward the user request to a remote resource on the Internet 250. At stage 350, the MEG 230 can receive a response to the user request from the remote resource and then forward the response back to the requesting mobile device 210. A connection or user session can then be established between the mobile device 210 and the remote resource in the Internet 250. At stage 360, the MEG 230 can detect the application and content information of one or more SDFs of the connection or user session. At stage 370, the MEG 230 can send the detected application and content information of the one or more SDFs to the cSON 240. In some embodiments, the MEG 230 can send an update message containing application and content information via an interface (e.g., Application Detection and Control Interface). At stage 380, the cSON 240 can perform optimization to the access node 220 at least partially based on the application and content information detected by and received from the MEG 230.

The systems and methods described in the disclosed subject matter can be implemented in many use scenarios. In one scenario, embodiments of the disclosed subject matter can enhance dynamic SON procedures like Inter Cell Interference Coordination (ICIC). In this scenario, a MEG can expose an Application Detection and Control interface to a cSON server. The interface can be used to inform the cSON server the type of content that is being accessed for a given SDF. The interface can map the 5 tuple/EPC bearer/radio bearer with the content type being accessed (e.g. YouTube, Skype, Bit torrent, etc.). In some embodiments, the 5 tuple can include the source IP address, the destination IP address, the source port number, the destination port number, and the protocol in use. Content awareness can allow the ICIC algorithms in the cSON server to do more intelligent interference coordination. For example, longer time gaps can be created for service data flows that are of background type (e.g., software update, application download, and P2P) while shorter time gaps can be created for service data flows that have more real time/interactive content (e.g., video streaming, VOIP, and live audio/video communication).

In another scenario, embodiments of the disclosed subject matter can enhance dynamic SON procedures like Mobility Robustness Optimization (MRO). In this scenario, per session application/content awareness can allow the cSON servers to do further optimization of active mode and idle mode handovers. One of the goals of application/content aware MRO is to dynamically improve the network performance of handovers to provide increased network capacity as well as enhance subscriber experience. Content awareness can allow cSON servers to better adapt cell parameters to adjust handover boundaries in addition to typical radio link performance indicators. Different parameters can be set per application/content type as provided by the Application Detection and Control interface from a MEG platform. For example, radio link failures for voice sessions can be disastrous as it could result in a call drop while temporary radio link failures could be tolerated for non-real time application as the TCP layer could adapt accordingly. In addition, content awareness can also enable decision making at the cSON servers to trigger handovers to appropriate Radio Access Technology (RAT). For example, QoS demands of an application can influence the handover of a session to appropriate RAT (3G/4G) or Wi-Fi.

In another scenario, embodiments of the disclosed subject matter can enhance dynamic SON procedures like HetNet load balancing. Given the dense deployments of HetNets, devices can have choice to connect to multiple cells as well as Wi-Fi access points. In addition, multiple cells can be of different RATs (3G, 4G). One of the goals can be to intelligently spread user traffic across all available access technologies to maximize system capacity while providing good quality of experience and performance to end users. In general, HetNet load balancing can be performed to two modes: (1) load balancing at initial device attach—placing a device in the most appropriate cell/Wi-Fi access point (AP) when new attach requests are received; and (2) rebalance for existing sessions—When HetNet gets imbalanced over time due to varying traffic usage patterns, periodic re-balance can relocate sessions from overloaded cells to neighbor or co-located carriers. A cSON server can periodically report small cell/Wi-Fi AP loads as well as UE RF and RLF reports to a MEG platform. The MEG platform can use this information to select the right RAT/cell when the UE performs initial attach to the network. In addition, the MEG can re-locate service data flows to Wi-Fi APs when appropriate.

In some embodiments, a MEG can have a native content analysis engine that can perform application detection on a per subscriber flow basis. Every flow can be tagged with its detected application/content type. Such {flow, application type} tuple can be stored and offered to the cSON server via an Application Detection and Control interface. The interface can be implemented in multiple ways. Some exemplary implementations can include: stateless Hypertext Transport Protocol (HTTP) message, GPRS Tunneling Protocol (GTP-U) header extension, and Differentiated Services Code Point (DSCP) header extension.

In the first exemplary implementation, a restful stateless HTTP message can be used between a MEG and a cSON server. The contents in the HTTP message can be XML coded. There can be two flavors of transaction types: START and STOP. START transaction can be used when a new flow established and the application type has been detected. START transaction can carry the {flow, application type} tuple. STOP transaction can be used when the flow is deleted. One example of HTTP methods that can be used is POST. In the second exemplary implementation, a new GTP-U header extension can be created and can be referred to as a Service Class Indicator (SCI). A SCI can be a 2-byte field that binary encodes the application ID. This in band information can make its way to the cSON server via user plane (e.g., eNB). In the third exemplary implementation, a DSCP header can be used to encode application type (as long as downstream IP routing nodes don't modify the header).

An exemplary implementation of the Application Detection and Control Interface over HTTP transport to radio nodes is described below.

HTTP Post Header: Attributes can be exported via HTTP Post request. A MEG can act as the HTTP client for requests initiated from its side. The client can send the updates encapsulated in a standard HTTP Post with the following syntax:

```
POST /update/user/IMSI/imsi HTTP/1.0
Host: 192.168.1.100:9191
User-Agent: benu---meg
Content-Type: text/xml; charset="UTF-8"
Content-Length: 800
```

The messaging paradigm can be built over HTTP Post Request-URI. The generic format can use the following syntax:

/<operation>/<objects>/<attribute>/<value>

The <operation> and <objects> elements can be mandatory portions of the Request-URI. Each operation can be applied to all of the objects in the message body using the optionally specified attribute/value. For example, the following message can update the content type binding for a particular user/session.

```
/update/users/IMSI/310150123456789
Or
/update/users/IP/192.168.1.100
```

The body of the HTTP Post request can contain the objects being updated encoded as XML.

The protocol can support at least two types of operations: Update and Remove. The Update operation can replace the specified event Attribute-Value pair (AVP) state for all objects in the message body. The message body can specify additional attributes associated with the object. The Remove operation can remove state for all objects specified in the message body. The object can be represented in the message body using unique keys. Any update of a particular object can replace any past updates. The Attribute-Value pair (AVP) can be associated with all objects specified in the message body.

HTTP Post Body Encoding: Attributes can be encoded within XML. Attributes can be defined within the context of the URL as part of the encapsulated HTTP Post request.

One example of the user attribute syntax used for updates is illustrated below:

```
<?xml version="1.0" encoding="ISO-8859-1"?>
<xs:schema xmlns:xs="http://www.w3.org/2001/XMLSchema"
elementFormDefault="qualified" version="0.1">
  <xs:element name="usersList">
    <xs:complexType>
      <xs:sequence>
        <xs:element name="user" maxOccurs="unbounded">
          <xs:complexType>
```

```
         <xs:sequence>
            <xs:element name="ip" type="xs:string" minOccurs="1" maxOccurs="1"/>
            <xs:element name="imsi" type="xs:long" minOccurs="1" maxOccurs="1"/>
            <xs:element name="content-type" type="xs:string" minOccurs="1"
maxOccurs="1"/>
            <xs:element name="flow" type="xs:string" minOccurs="1" maxOccurs="1"/>
         </xs:sequence>
        </xs:complexType>
      </xs:element>
    </xs:sequence>
  </xs:complexType>
 </xs:element>
</xs:schema>
```

One example of the user attribute is illustrated below:

```
<?xml version="1.0" encoding="ISO-8859-1"?>
<usersList xmlns:xsi="http://www.w3.org/2001/XMLSchema-instance"
xsi:noNamespaceSchemaLocation="benu_adci_schema.xsd">
 <user>
   <ip>10.0.0.2</ip>
   <imsi>310150123456789</imsi>
   <content-type>bit-torrent</content-type>
   <flow>from-ip, to-ip, from-port, to-port, teid/gre key</flow>
 </user>
</usersList>
```

In the example above, a content type of bit-torrent is detected for a service data flow defined by the 5 tuple specified in <flow>.

Figure 4:
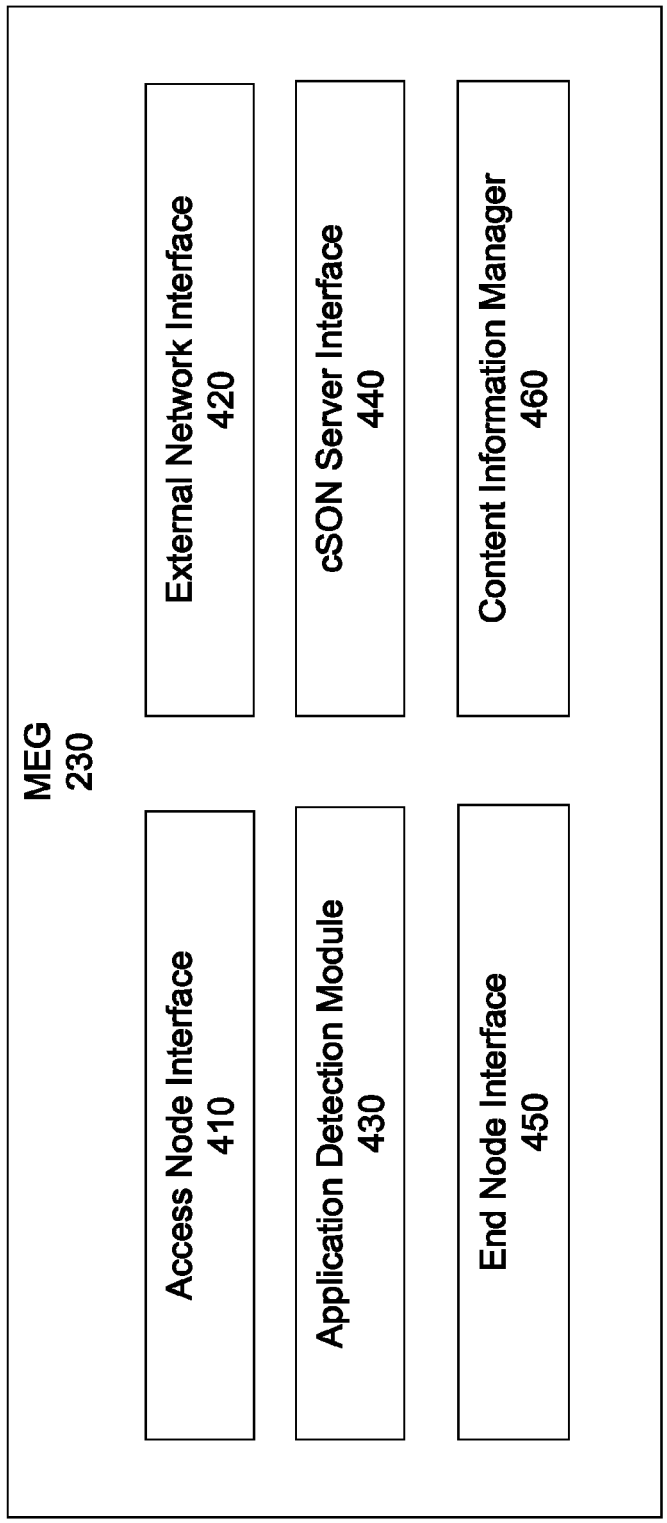
FIG. 4 contains a block diagram of an exemplary mobile evolved gateway (MEG).

FIG. 4 contains a block diagram of an exemplary mobile evolved gateway (MEG) 230 according to certain embodiments of the disclosed subject matter. The MEG 230 can include an access node interface 410, an external network interface 420, an application detection module 430, a cSON server interface 440, an end node interface 450, and a content information manager 460. The MEG 230 can include additional modules, fewer modules, or any other suitable combination of modules that perform any suitable operation or combination of operations. Two or more components can be combined or merged. Certain function can be split among two or more components.

The access node interface 410 can serve as the communication interface between the MEG 230 and one or more access nodes (e.g., 220 in FIG. 2). The interface can be in the form of an Iu interface, an Generic Routing Encapsulation (GRE) interface, or an Si interface, etc. The access node interface 410 can receive an IP session request from a mobile device (e.g., 210 in FIG. 2) via an access node. The access node interface 410 can also establish an IP session with the mobile device. In some embodiments, an access node interface (e.g., 410 in FIG. 4) can be implemented in hardware and/or software running on a general or dedicated processor in a MEG (e.g., 230 in FIG. 4).

The external network interface 420 can serve as the communication interface between the MEG 230 and one or more external networks (e.g., 250 in FIG. 2). The external network interface 420 can receive a request from a mobile device (e.g., 210 in FIG. 2) to access a remote resource (e.g., on the Internet). The external network interface 420 can also establish a connection or user session between the mobile device and the remote resource. In some embodiments, an external network interface (e.g., 420 in FIG. 4) can be implemented in hardware and/or software running on a general or dedicated processor in a MEG (e.g., 230 in FIG. 4).

The application detection module 430 can detect application and content information of one or more service data flows (SDF) in a connection or user session. The application and content information can provide content-awareness to a self-optimization network server. In some embodiments, an application detection module (e.g., 430 in FIG. 4) can be implemented in hardware and/or software running on a general or dedicated processor in a MEG (e.g., 230 in FIG. 4).

The cSON server interface 440 can serve as the communication interface between the MEG 230 and one or more cSON servers (e.g., 240 in FIG. 2). The cSON server interface 440 can provide an Application Detection and Control Interface as described earlier in this document. The MEG 230 can send the application and content information to a cSON server via the cSON server interface 440. The MEG 230 can also receive report son access node status from a cSON server via the cSON server interface 440. In some embodiments, an cSON server interface (e.g., 440 in FIG. 4) can be implemented in hardware and/or software running on a general or dedicated processor in a MEG (e.g., 230 in FIG. 4).

The end node interface 450 can serve as the communication interface between the MEG 230 and one or more end nodes (e.g., mobile devices 210 in FIG. 2). The end node interface 450 can receive session or user requests from mobile devices. The end node interface 450 can direct a mobile device to a selected access node or radio access technologies (RAT) when a mobile device tries to attach to the network. In some embodiments, an end node interface (e.g., 450 in FIG. 4) can be implemented in hardware and/or software running on a general or dedicated processor in a MEG (e.g., 230 in FIG. 4).

The content information manager 460 can manage the application and content information of service data flows. The content information manager 460 can store the application and content information detected by the application detection module 430. The content information manager 460 can also update the stored application and content information based on updated information received from the application detection module 430. In some embodiments, an content information manager (e.g., 460 in FIG. 4) can be implemented in hardware and/or software running on a general or dedicated processor in a MEG (e.g., 230 in FIG. 4).

Optionally, the MEG 230 can also include an application and content information encoder to encode the application and content information. In some embodiments, the application and content information can be encoded in XML.

Figure 5:
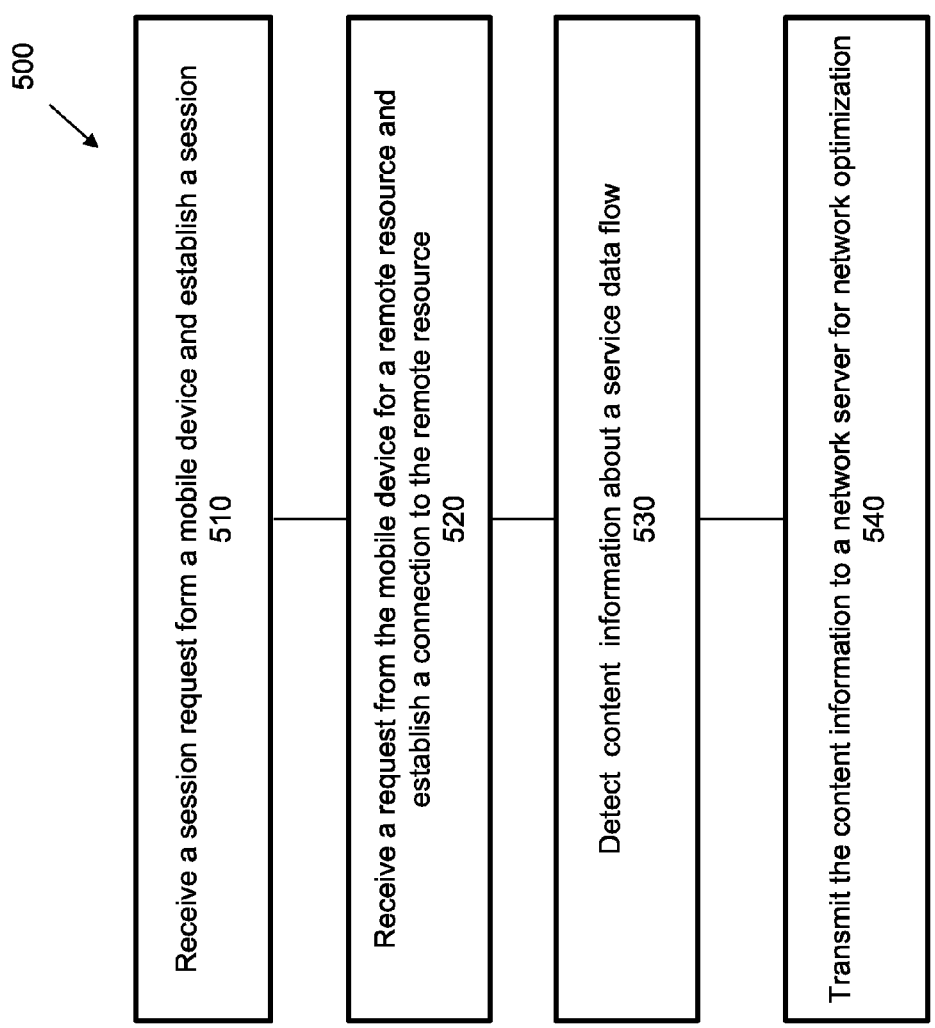
FIG. 5 illustrates an exemplary operation of an mobile evolved gateway (MEG).

FIG. 5 illustrates an exemplary operation 500 of network optimization according to certain embodiments of the disclosed subject matter. The operation 500 can be modified by, for example, having stages rearranged, changed, added and/or removed.

At stage 510, a session request can be received at, e.g., a MEG (such as 230 in FIG. 2), from a mobile device (such as 210 in FIG. 2). In some embodiments, the session request can be an IP session request. A session (e.g., an IP session) can be established between the mobile device and the MEG.

At stage 520, a request can be received at, e.g., a MEG (such as 230 in FIG. 2), from a mobile device (such as 210 in FIG. 2) to access a remote resource (e.g., on the Internet 250). In some embodiments, the request can be a user HTTP request to, e.g., access a website. A connection or user session (e.g., an HTTP user session) can be established between the mobile device and the remote resource via, e.g., the MEG.

At stage 530, application and content information can be detected for one or more service data flows (SDF). As discussed earlier in this document, the application and content information can be used to enhance optimization of self-optimization networks.

At stage 540, the application and content information can be transmitted to a network server for network optimization. In some embodiments, the network server is a SON server. The application and content information can make the SON server a content aware SON server (cSON). The application and content information can be encoded in various format (e.g., XML) and can be transmitted via an Application Detection and Control Interface of a MEG.

Optionally, a mobile device can be directed to disconnect from a currently connected access node and can also be directed to connect to a different access node.

Figure 6:
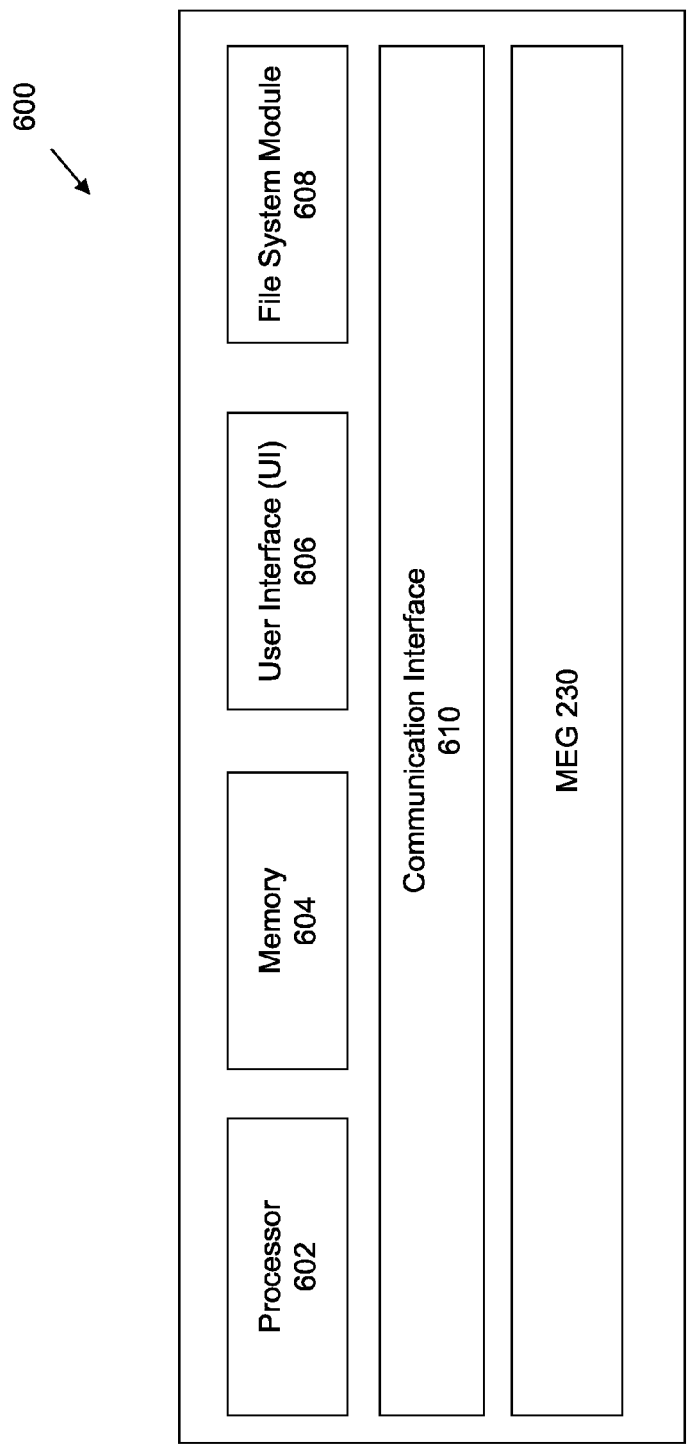
FIG. 6 contains a block diagram of an exemplary computing device.

FIG. 6 illustrates a block diagram of an exemplary computing device 600 according to certain embodiments of the disclosed subject matter. The computing device 600 can include at least one processor 602 and at least one memory 604. The processor 602 can be hardware that is configured to execute computer readable instructions such as software. The processor 602 can be a general processor or be an application specific hardware (e.g., an application specific integrated circuit (ASIC), programmable logic array (PLA), field programmable gate array (FPGA), or any other integrated circuit). The processor 602 can execute computer instructions or computer code to perform desired tasks. The memory 604 can be a transitory or non-transitory computer readable medium, such as flash memory, a magnetic disk drive, an optical drive, a programmable read-only memory (PROM), a read-only memory (ROM), a random access memory (RAM), or any other memory or combination of memories.

The computing device 600 can also optionally include a user interface (UI) 606, a file system module 608, and a communication interface 610. The UI 606 can provide an interface for users to interact with the computing device 600 in order to access the MEG 230. The file system module 608 can be configured to maintain a list of all data files, including both local data files and remote data files, in every folder in a file system. The file system module 608 can be further configured to coordinate with the memory 604 to store and cache files/data. The communication interface 610 can allow the computing device 600 to communicate with external resources (e.g., a network or a remote client/server). The computing device 600 can also include a MEG 230. The description of the MEG 230 and its functionalities can be found in the discussion of FIGS. 1-5. The computing device 600 can include additional modules, fewer modules, or any other suitable combination of modules that perform any suitable operation or combination of operations.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "manager," "interface," and "host" is not software per se and includes at least some tangible, non-transitory hardware that is configured to execute computer readable instructions. In addition, the phrase "based on" does not imply exclusiveness—for example, if X is based on A, X can also be based on B, C, and/or other factor(s).

What is claimed is:

1. A computerized method, comprising:
   receiving at a mobile gateway a session request from a mobile device;
   establishing a session between the mobile device and the mobile gateway;
   receiving a request from the mobile device at the mobile gateway to access a remote resource;
   establishing a connection between the mobile device and the remote resource via the mobile gateway;
   detecting at least two types of application and content information of a set of service data flows of the connection, wherein the at least two types of application and content information include a background type and an interactive type; and
   sending the at least two types of application and content information of the set of service data flows to a network server for network optimization, wherein the network optimization includes:
   creating a first time gap for one or more service data flows from the set of service data flows that are of the background type; and
   creating a second time gap for one or more other service data flows from the set of service data flows that are of the interactive type,
   wherein the first time gap is longer than the second time gap.

2. The computerized method of claim 1, wherein the session request is an IP session request and the session is an IP session.

3. The computerized method of claim 1, wherein the request is a user HTTP request.

4. The computerized method of claim 1, wherein the session request is received from the mobile device via an access node.

5. The computerized method of claim 4, wherein the access node is one of an WI-FI access point (AP), a radio base station, a 3G small cell, an eNodeB macro cell, or an eNodeB small cell.

6. The computerized method of claim 1, further comprising encoding the at least two types of application and content information in an XML format.

7. The computerized method of claim 1, wherein the at least two types of application and content information of the set of service data flows are sent via an interface on the mobile gateway.

8. The computerized method of claim 7, wherein the interface is implemented using Hypertext Transport Protocol (HTTP) messages.

9. The computerized method of claim 7, wherein the interface is implemented using GPRS Tunneling Protocol (GTP-U) header extension.

10. The computerized method of claim 7, wherein the interface is implemented using Differentiated Services Code Point (DSCP) header extension.

11. The computerized method of claim 1, wherein the network server is a SON server.

12. A mobile gateway, comprising:
    an access node interface configured to receive a session request from a mobile device via an access node and establish a session with the mobile device;
    an external network interface configured to receive a request from the mobile device to access a remote resource and establish a connection between the mobile device and the remote resource;
    an application detection module configured to detect at least two types of application and content information of a set of service data flows of the connection, wherein the at least two types of application and content information include a background type and an interactive type; and
    a network optimization server interface configured to send the at least two types of application and content information of the set of service data flows to a network server for network optimization, wherein the network optimization includes:
        creating a first time gap for one or more service data flows from the set of service data flows that are of the background type; and
        creating a second time gap for one or more other service data flows from the set of service data flows that are of the interactive type,
        wherein the first time gap is longer than the second time gap.

13. The mobile gateway of claim 12, further comprising an end node interface configured to communicate with the mobile device.

14. The mobile gateway of claim 13, wherein the end node interface is configured to direct the mobile device to disconnect from a currently connected access node.

15. The mobile gateway of claim 14, wherein the end node interface is further configured to direct the mobile device to connect to a second access node.

16. The mobile gateway of claim 12, further comprising an application and content information encoder configured to encode the at least two types of application and contention information.

17. The mobile gateway of claim 16, wherein the at least two types of application and contention information are encoded in XML format.

18. The mobile gateway of claim 12, wherein the network server is a self-optimizing network (SON) server.

19. The mobile gateway of claim 12, wherein the network optimization server interface is configured to send the at least two types of application and content information using Hypertext Transport Protocol (HTTP) messages.

20. The mobile gateway of claim 12, wherein the network optimization server interface is configured to send the at least two types of application and content information using GPRS Tunneling Protocol (GTP-U) header extension.

21. The mobile gateway of claim 12, wherein the network optimization server interface is configured to send the at least two types of application and content information using Differentiated Services Code Point (DSCP) header extension.

22. A non-transitory computer readable medium having executable instructions operable to, when executed by a processor, cause the processor to:
    receive at a mobile gateway a session request from a mobile device;
    establish a session between the mobile device and the mobile gateway;
    receive a request from the mobile device at the mobile gateway to access a remote resource;
    establish a connection between the mobile device and the remote resource via the mobile gateway;
    detect at least two types of application and content information of a set of service data flows of the connection, wherein the at least two types of application and content information include a background type and an interactive type; and
    send the at least two types of application and content information of the set of service data flows to a network server for network optimization, wherein the network optimization includes:
        creating a first time gap for one or more service data flows from the set of service data flows that are of the background type; and
        creating a second time gap for one or more other service data flows from the set of service data flows that are of the interactive type,
        wherein the first time gap is longer than the second time gap.

23. The non-transitory computer readable medium of claim 22, wherein the network server is a SON server.

* * * * *